Figure 1:
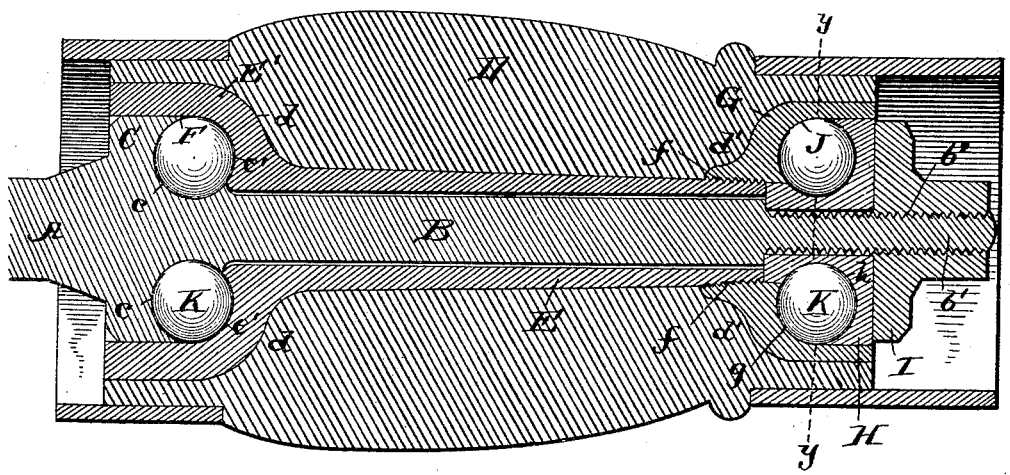
Figure 1:
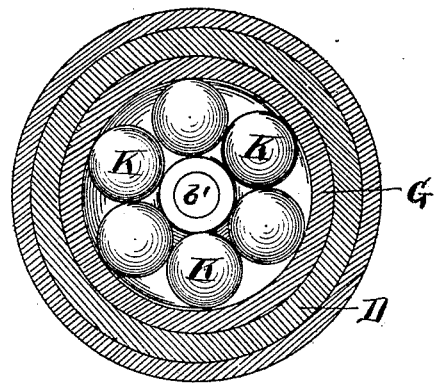

(No Model.)

C. A. MILLER & A. M. GRISWOLD.
BALL BEARING FOR VEHICLE AXLES.

No. 460,878. Patented Oct. 6, 1891.

Fig. II

Witnesses:
J. B. McGier
William O. Belt

Inventors.
Charles A. Miller and
Abram M. Griswold.
By Edson Bros,
their Attorneys

UNITED STATES PATENT OFFICE.

CHARLES A. MILLER AND ABRAM M. GRISWOLD, OF MOMENCE, ILLINOIS.

BALL-BEARING FOR VEHICLE-AXLES.

SPECIFICATION forming part of Letters Patent No. 460,878, dated October 6, 1891.

Application filed January 31, 1891. Serial No. 379,817. (No model.)

*To all whom it may concern:*

Be it known that we, CHARLES A. MILLER and ABRAM M. GRISWOLD, citizens of the United States, residing at Momence, in the county of Kankakee and State of Illinois, have invented certain new and useful Improvements in Ball-Bearing Axles for Vehicles; and we do hereby declare the following to be a full, clear, and exact description of the invention, such as will enable others skilled in the art to which it appertains to make and use the same.

Our present invention relates to improvements in ball-bearing axles for vehicles, adapted for use on sulkies, road-carts, farm-wagons, drag-carts, carriages, and all other kinds of vehicles; and the object of the invention is to diminish the friction on the parts to a minimum and to provide a ball-bearing for the endwise thrust of the axle, so that the balls serve to support the wheel for both the rotary and lateral movements.

With these and other ends in view the invention consists in the novel construction and arrangement of parts, as will be hereinafter fully described and claimed.

In the accompanying drawings, Figure I is a central longitudinal sectional view of our improved ball-bearing axle for vehicles, and Fig. II is a vertical transverse sectional view on the line $y\ y$ of Fig. I.

Referring to the drawings, in which like letters of reference denote corresponding parts in both figures, A is the axle, and B the journal thereof. At a point between the axle proper and the journal thereof we provide an enlargement or rib C, which projects radially beyond the surface of the axle and journal, and in the front side of this enlargement or rib is an annular groove or recess $c$.

D is the hub of the vehicle-wheel, and E is the metallic box or sleeve, which is fitted tightly within the bore of the hub and is arranged to fit snugly around the journal B, but to leave a small space between the box and journal, so that said parts are subjected to very little friction and wear. At its ends the interior of the hub is recessed or cut away, (see $d\ d'$ in Fig. I,) and in the recess $d$ at the inner end of the hub is tightly fitted the enlarged or flared mouth E', formed on the corresponding end of said metallic box. This mouth E' is flared and shaped so as to extend to the inner end of the hub and inclose the flange or enlargement C, and on its inner surface the flare or mouth E' is formed with a concave recess $e'$, which lies immediately opposite to and concentric with the annular groove $c$ in the flange C, and thereby forms an annular chamber F within and between the flange C and mouth E' of the axle-box.

The outer end of the axle box or thimble E terminates within the recess $d'$ and is provided with a screw-thread $f$, on which is screwed the inner end of the gland G, which is arranged in the recess $d'$ of the hub, the inner face of the gland terminating in the plane of the outer face of the box or thimble E.

The outer end of the journal B is reduced and extending through and beyond the end of the hub, as at $b'$, and this extension is screw-threaded at $b^2$ to enable a gland H and a nut I to be screwed on the said threaded end of the journal. In the opposing faces of the glands G H are made annular grooves or recesses $g\ h$, which are arranged concentric with each other to form a space or chamber J.

In the chambers F J at the ends of the thimble are fitted the balls K, which are placed loosely in said chambers, and these balls serve to take up the wear on the parts in the rotary movement of the wheel-hub on the axle-journal and also to take up the endwise or angular thrust of the hub as it passes over uneven surfaces, as the balls bear solidly against the ends of the hub and the parts associated therewith. The gland H is screwed tight against the end of the axle box or thimble, and the nut I is fitted on the threaded end $b'$ outside of the glands and serves to confine them in place.

Our improved axle-bearing reduces the friction and wear on the parts to a minimum, enables the parts to be readily and securely put together or taken apart for inspection and repair, and it is simple in construction and cheap of manufacture.

Having thus fully described our invention, what we claim as new, and desire to secure by Letters Patent, is—

1. In a ball-bearing axle for vehicles, the combination of an axle having the integral enlarged flange C at its inner end, the box or thimble flared at its inner end and extending over said flange C to inclose the same, the inner faces of the flange and flared box being coincidently grooved, the two grooved glands G I, screwed, respectively, to the outer ends of the box and the axle, and with the gland I arranged within the gland G, flush with the outer surface thereof, the nut fitted on the axle and bearing on the inner gland, and the balls, all arranged and combined substantially as herein shown and described.

2. In a ball-bearing axle for vehicles, the combination of an axle provided with the enlargement or shoulder C, the box or thimble provided with a flared end which incloses said shoulder, and the inner faces of the shoulder and said flared end being grooved to form an annular chamber, the gland G, screwed on the outer end of the box, the gland H, screwed on the axle-journal and arranged within the gland G, the inner faces of the two glands being grooved to form another chamber, the balls fitted in said chambers, and the nut, substantially as described.

In testimony whereof we affix our signatures in presence of two witnesses.

CHARLES A. MILLER.
ABRAM M. GRISWOLD.

Witnesses:
J. H. SCRAMLIN,
HIRAM HOAG.